(12) United States Patent
Takiguchi et al.

(10) Patent No.: US 9,957,893 B2
(45) Date of Patent: May 1, 2018

(54) COMBUSTOR AND GAS TURBINE PROVIDED WITH SAME

(75) Inventors: Satoshi Takiguchi, Tokyo (JP); Keijiro Saito, Tokyo (JP); Teruhiro Matsumoto, Tokyo (JP); Kenji Sato, Tokyo (JP); Hidenobu Tamai, Tokyo (JP); Shigemi Mandai, Takasago (JP)

(73) Assignee: MITSUBISHI HITACHI POWER SYSTEMS, LTD., Yokohama-shi (JP)

( * ) Notice: Subject to any disclaimer, the term of this patent is extended or adjusted under 35 U.S.C. 154(b) by 421 days.

(21) Appl. No.: 14/007,253

(22) PCT Filed: Mar. 14, 2012

(86) PCT No.: PCT/JP2012/056534
§ 371 (c)(1),
(2), (4) Date: Sep. 24, 2013

(87) PCT Pub. No.: WO2012/132898
PCT Pub. Date: Oct. 4, 2012

(65) Prior Publication Data
US 2014/0013762 A1   Jan. 16, 2014

(30) Foreign Application Priority Data
Mar. 30, 2011   (JP) .................................. 2011-074205

(51) Int. Cl.
*F02C 1/00* (2006.01)
*F02C 7/18* (2006.01)
(Continued)

(52) U.S. Cl.
CPC ................ *F02C 7/18* (2013.01); *F01D 9/023* (2013.01); *F01D 25/14* (2013.01); *F23R 3/002* (2013.01);
(Continued)

(58) Field of Classification Search
CPC ............ F01D 9/023; F23R 2900/00012; F23R 2900/03043; F23R 3/60
See application file for complete search history.

(56) References Cited

U.S. PATENT DOCUMENTS 8,079,219 B2 * 12/2011 Johnson et al. ................ 60/752
2003/0000216 A1   1/2003 Akagi et al.
(Continued)

FOREIGN PATENT DOCUMENTS

CN       101818690 A      9/2010
EP       1 271 057 A2     1/2003
(Continued)

OTHER PUBLICATIONS

Office Action dated Apr. 1, 2015, issued in corresponding Chinese Patent Application No. 201280013778.5, with English translation (17 pages).
(Continued)

*Primary Examiner* — Gerald L Sung
(74) *Attorney, Agent, or Firm* — Westerman, Hattori, Daniels & Adrian, LLP

(57) ABSTRACT

A combustor (10) according to the invention includes: a combustor basket (14) in which compressed air and fuel are mixed with each other and the mixture is combusted; a transition piece (17) in which a tip portion of the combustor basket (14) is inserted with a gap (C) therebetween; a spring clip (19) that seals the gap between the combustor basket (14) and the transition piece (17); a throttle section (21) that is provided in an opening portion (Ck) of the gap (C) that is opened to the transition piece (17) on the tip side of the combustor basket (14), and narrows an opening area of the opening portion (Ck), compared to the base end side; and cooling device (22) for cooling the throttle section (21).

12 Claims, 13 Drawing Sheets

(51) Int. Cl.
 F23R 3/42 (2006.01)
 F23R 3/00 (2006.01)
 F23R 3/28 (2006.01)
 F01D 9/02 (2006.01)
 F01D 25/14 (2006.01)

(52) U.S. Cl.
 CPC ............... *F23R 3/286* (2013.01); *F23R 3/42* (2013.01); *F23R 2900/00012* (2013.01)

(56) References Cited

U.S. PATENT DOCUMENTS

| | | | |
|---|---|---|---|
| 2005/0132708 A1* | 6/2005 | Martling | F01D 9/023 60/752 |
| 2005/0262844 A1* | 12/2005 | Green et al. | 60/752 |
| 2007/0258808 A1* | 11/2007 | Ohri | F01D 9/023 415/139 |
| 2008/0179837 A1 | 7/2008 | Ryan | |
| 2009/0120093 A1* | 5/2009 | Johnson et al. | 60/752 |
| 2009/0120096 A1* | 5/2009 | Tuthill | F01D 9/023 60/755 |
| 2010/0077761 A1 | 4/2010 | Johnson et al. | |
| 2011/0252805 A1* | 10/2011 | Berry et al. | 60/772 |
| 2012/0047910 A1* | 3/2012 | Sutcu | F01D 9/023 60/796 |

FOREIGN PATENT DOCUMENTS

| | | |
|---|---|---|
| EP | 2 187 022 A | 5/2010 |
| EP | 2 187 022 A1 | 5/2010 |
| JP | 8-270947 A | 10/1996 |
| JP | 8-284688 A | 10/1996 |
| JP | 8-285284 A | 11/1996 |
| JP | 9-195799 A | 7/1997 |
| JP | 10-238777 A | 9/1998 |
| JP | 2003-13747 A | 1/2003 |
| JP | 2003-14236 A | 1/2003 |
| JP | 2003-312903 A | 11/2006 |
| JP | 2006-312903 A | 11/2006 |
| JP | 2010-84763 A | 4/2010 |
| JP | 2010-181108 A | 8/2010 |

OTHER PUBLICATIONS

Extended European Search Report dated Apr. 28, 2015, issued in corresponding Application No. 12764209.8 (6 pages).
International Search Report for PCT/JP2012/056534, dated of Apr. 17, 2012, w/English translation.
Written Opinion of PCT/JP2012/056534, dated Apr. 17, 2012, w/English translation.
International Search Report for PCT/JP2012/056534, dated Apr. 17, 2012, w/English translation.

* cited by examiner

COMBUSTOR AND GAS TURBINE PROVIDED WITH SAME

TECHNICAL FIELD

The present invention relates to a combustor in which a tip portion of a combustor basket is inserted into a transition piece with a gap interposed therebetween, and a gas turbine provided with the combustor.

Priority is claimed on Japanese Patent Application No. 2011-074205, filed Mar. 30, 2011, the content of which is incorporated herein by reference.

BACKGROUND ART

A gas turbine includes a compressor which generates compressed air, a combustor which mixes fuel with the compressed air and combusts the mixture, thereby generating combustion gas, and a turbine which is rotationally driven by the combustion gas. Among them, the combustor has a combustor basket into which the compressed air is introduced from the compressor and which generates the combustion gas, and a transition piece which guides the generated combustion gas to the turbine. Here, connection of the combustor basket and the transition piece is performed by inserting a tip portion of the combustor basket into the transition piece. At this time, a spring member called a spring clip provided at the tip portion of the combustor basket along a circumferential direction thereof enters a state of being crushed in the gap between the combustor basket and the transition piece. Then, the outer peripheral surface of the combustor basket is pressed against the inner peripheral surface of the transition piece by the restoring force of the spring clip which tries to return to its original shape, whereby the two are connected so as to be unable to fall off (refer to PTL 1, for example).

CITATION LIST

Patent Literature

[PTL 1] Japanese Unexamined Patent Application, First Publication No. 2006-312903

SUMMARY OF INVENTION

Problem to be Solved by the Invention

However, according to the combustor of the related art, a swirling current of the combustion gas is generated in a connection section between the combustor basket and the transition piece and the swirling current flows backward through the gap between the combustor basket and the transition piece, whereby the spring clip disposed in the gap is exposed to the high-temperature combustion gas. Therefore, in order to prevent burnout of the spring clip, cooling device thereof is required. Here, as the cooling device of the spring clip, a direct way to blow air for cooling is conceivable. However, if flame temperature of a combustion burner provided in the combustor basket rises due to mixing in of the cooling air, the amount of emission of a nitrogen oxide increases.

Therefore, as another means for cooling the spring clip, a way to cool the spring clip by using leaked air which flows from the outside into the gap across the spring clip is used. However, since the leaked air is a small amount, in recent years when the temperature of combustion gas has been on a rising trend in order to attain higher efficiency of a gas turbine, it has not been possible to sufficiently cool the spring clip. Therefore, means for reliably cooling the spring clip using a small amount of leaked air is required.

The present invention has been made in consideration of such circumstances and is to provide means for reliably preventing a spring clip provided in the gap between a combustor basket and a transition piece from burning out by being exposed to high-temperature combustion gas which has flowed into the gap.

Means for Solving the Problem

According to an aspect of the invention, there is provided a combustor including: a combustor basket in which compressed air and fuel are mixed with each other and the mixture is combusted; a transition piece in which a tip portion of the combustor basket is inserted with a gap therebetween; a spring clip that seals the gap between the combustor basket and the transition piece; a throttle section that is provided in an opening portion of the gap that is opened to the transition piece on the tip side of the combustor basket, and narrows an opening area of the opening portion, compared to the base end side of the combustor basket; and cooling device for cooling the throttle section.

According to such a configuration, leaked air which has flowed from the outside into the gap between the combustor basket and the transition piece through the spring clip increases in flow rate when passing through an area where an opening area is narrowed by the throttle section, and then flows from the opening portion into the transition piece. Therefore, combustion gas generated in a connection section between the combustor basket and the transition piece is inhibited by the flow of the leaked air, whereby an inflow amount into the gap is reduced. Therefore, it is possible to suppress burnout of the spring clip provided in the gap due to exposure to the combustion gas.

Further, in the combustor according to the aspect of the invention, the throttle section may be provided by projecting an inner surface of the transition piece to the combustor basket.

According to such a configuration, it is possible to dispose the throttle section in the gap between the combustor basket and the transition piece without interfering with the spring clip.

Further, in the combustor according to the aspect of the invention, the throttle section may be provided by projecting an outer surface of the combustor basket to the transition piece.

According to such a configuration, it is possible to manufacture the throttle section by a simple process, compared to a case where the throttle section is provided on the inner surface of the transition piece.

Further, in the combustor according to the aspect of the invention, the cooling device may cool the throttle section by injecting a cooling fluid to the throttle section.

According to such a configuration, it is possible to efficiently cool the throttle section by so-called impingement cooling.

Further, in the combustor according to the aspect of the invention, the cooling device may have an injection section that injects the cooling fluid toward the opening portion, and a guide section that guides the injected cooling fluid toward the throttle section.

According to such a configuration, it is possible to reliably blow the cooling fluid injected from the injection section against the throttle section by a simple configuration.

Further, in the combustor according to the aspect of the invention, the cooling device may cool the throttle section by making a fluid for cooling flow to the inside of the throttle section.

According to such a configuration, it is possible to efficiently cool the throttle section by so-called convection cooling.

Further, in the combustor according to the aspect of the invention, the cooling fluid that has flowed through the inside of the throttle section may flow out toward the opening portion from the throttle section.

According to such a configuration, the cooling fluid that has flowed out from the throttle section joins the leaked air and then flows out from the opening portion to the transition piece. Therefore, since inflow of the combustion gas into the gap is further inhibited, it is possible to more reliably suppress burnout of the spring clip.

Further, in the combustor according to the aspect of the invention, the cooling device may cool the throttle section by making a cooling fluid flow along the surface of the throttle section.

According to such a configuration, it is possible to efficiently cool the throttle section by so-called film cooling.

Further, in the combustor according to the aspect of the invention, the cooling device may make the cooling fluid flow along the surface on the combustor basket tip side in the throttle section.

According to such a configuration, since the cooling fluid easily forms a thin film on the surface of the throttle section, it is possible to efficiently cool the throttle section.

Further, in the combustor according to the aspect of the invention, the cooling device may make the cooling fluid flow along the surface on the combustor basket base end side in the throttle section.

According to such a configuration, the cooling fluid separated from the surface of the throttle section joins the leaked air and then flows out from the opening portion to the transition piece. Therefore, since inflow of the combustion gas into the gap is further inhibited, it is possible to more reliably suppress burnout of the spring clip.

Further, a gas turbine according to another aspect of the invention may include the combustor according to any one of the above.

According to such a configuration, by more reliably connecting the combustor basket and the transition piece constituting the combustor, it is possible to attain improvement in the reliability and higher efficiency of the gas turbine.

Effects of the Invention

According to the combustor related to the invention, it is possible to reliably prevent the spring clip provided in the gap between the combustor basket and the transition piece from burning out by being exposed to the high-temperature combustion gas which has flowed into the gap.

DESCRIPTION OF EMBODIMENTS

First Embodiment

Figure 1:
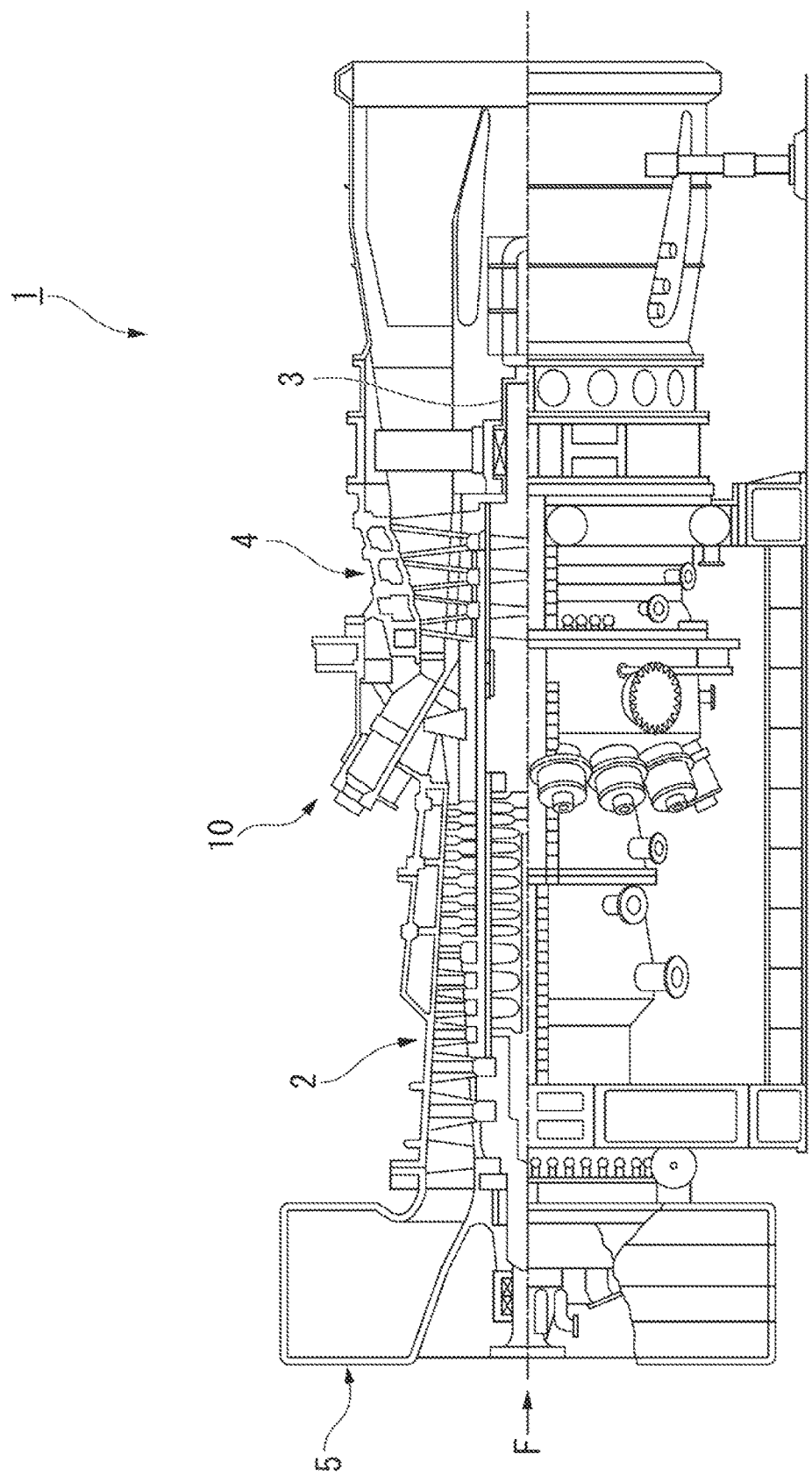
FIG. 1 is an overall configuration diagram of a gas turbine having a combustor related to a first embodiment of the invention.

Hereinafter, embodiments of the invention will be described referring to the drawings. First, the configuration of a combustor related to a first embodiment of the invention will be described. FIG. 1 is an overall configuration diagram of a gas turbine 1 having a combustor 10 related to the first embodiment of the invention.

The gas turbine 1 includes a compressor 2 provided on the side furthest upstream along a flow direction F of a fluid, the combustor 10 provided in a plurality along a circumferential direction of a turbine rotor 3 on the downstream side of the compressor 2, and a turbine 4 provided on the downstream side of the combustor 10, as shown in FIG. 1.

In the gas turbine 1 which is configured in this manner, first, the compressor 2 takes in external air from an air intake port 5 and compresses the air, thereby generating compressed air. Then, the combustor 10 injects fuel into the compressed air and then combusts a mixture of the fuel and the compressed air, thereby generating high-temperature and high-pressure combustion gas. Then, the turbine 4 is rotationally driven by the combustion gas and a driving force of the turbine rotor 3 constituting the turbine 4 is transmitted to an electric generator (not shown) or the like.

Figure 2:
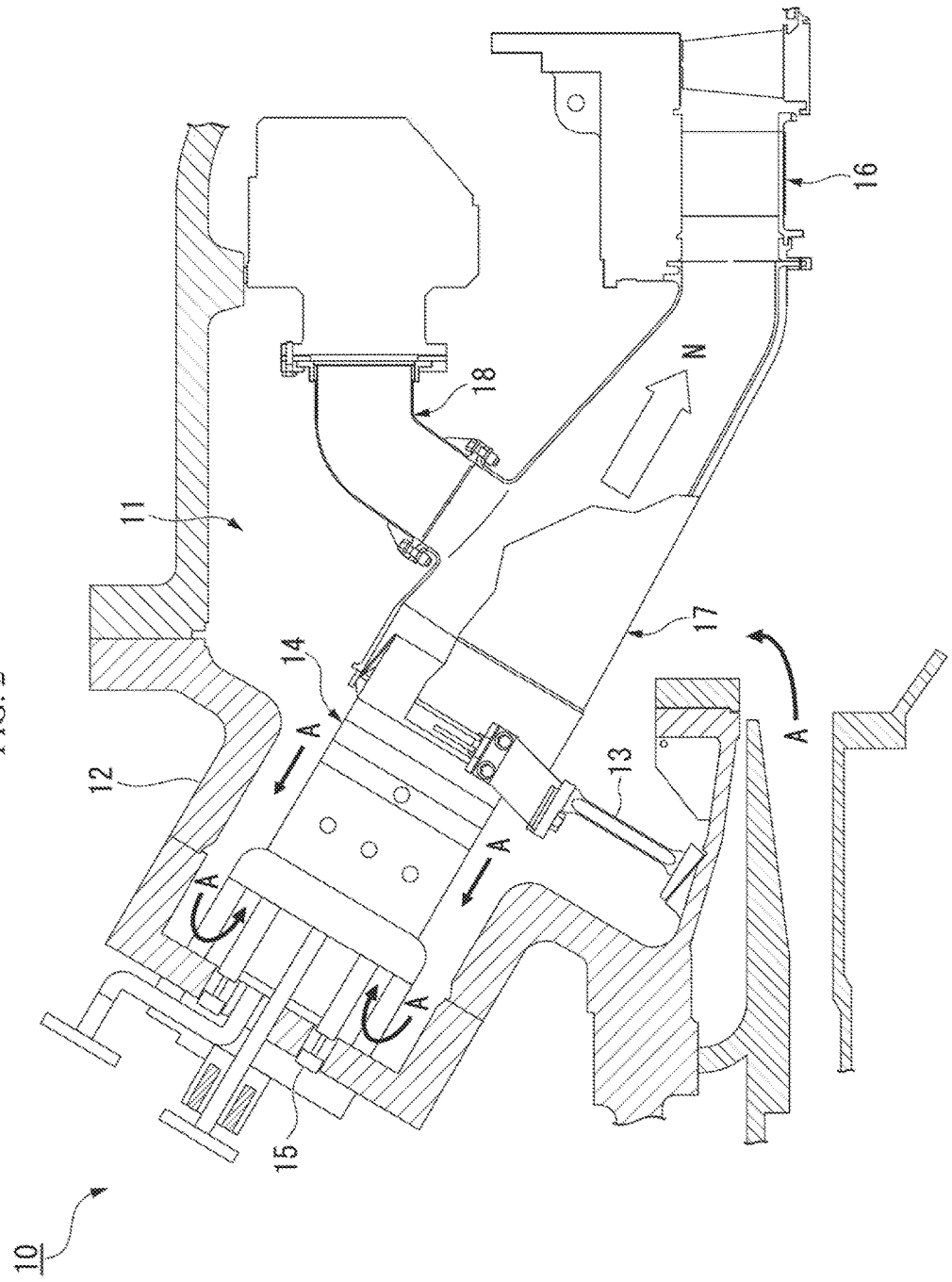
FIG. 2 is a schematic cross-sectional view showing the periphery of the combustor related to the first embodiment.

FIG. 2 is a schematic cross-sectional view showing the periphery of the combustor 10 related to the first embodiment. The combustor 10 includes a combustor basket 14, a fuel nozzle 15, a transition piece 17, and a bypass pipe 18.

The combustor basket 14 is accommodated in a turbine casing 11, and a base end portion thereof is fixed to a casing 12 and a tip portion thereof is connected to the transition piece 17.

The fuel nozzle 15 is provided to protrude at the base end portion of the combustor basket 14.

The transition piece 17 is accommodated in the turbine casing 11, and a base end portion thereof is connected to a turbine-side gas flow path 16 and a tip portion thereof is supported by a support member 13 in a state of being connected to the combustor basket 14.

One end of the bypass pipe 18 is connected to the transition piece 17.

In the combustor 10 which is configured in this manner, as shown in FIG. 2, compressed air A which has flowed from the compressor 2 (shown in FIG. 1) into the turbine casing 11 is introduced from the base end portion of the combustor basket 14 to the inside of the combustor basket 14. Then, the fuel nozzle 15 injects fuel into the compressed air A and ignition is then performed, whereby combustion gas N is generated. Then, the combustion gas N flows from the combustor basket 14 into the turbine-side gas flow path 16 through the transition piece 17 and is supplied to the turbine 4 (shown in FIG. 1).

Figure 3:
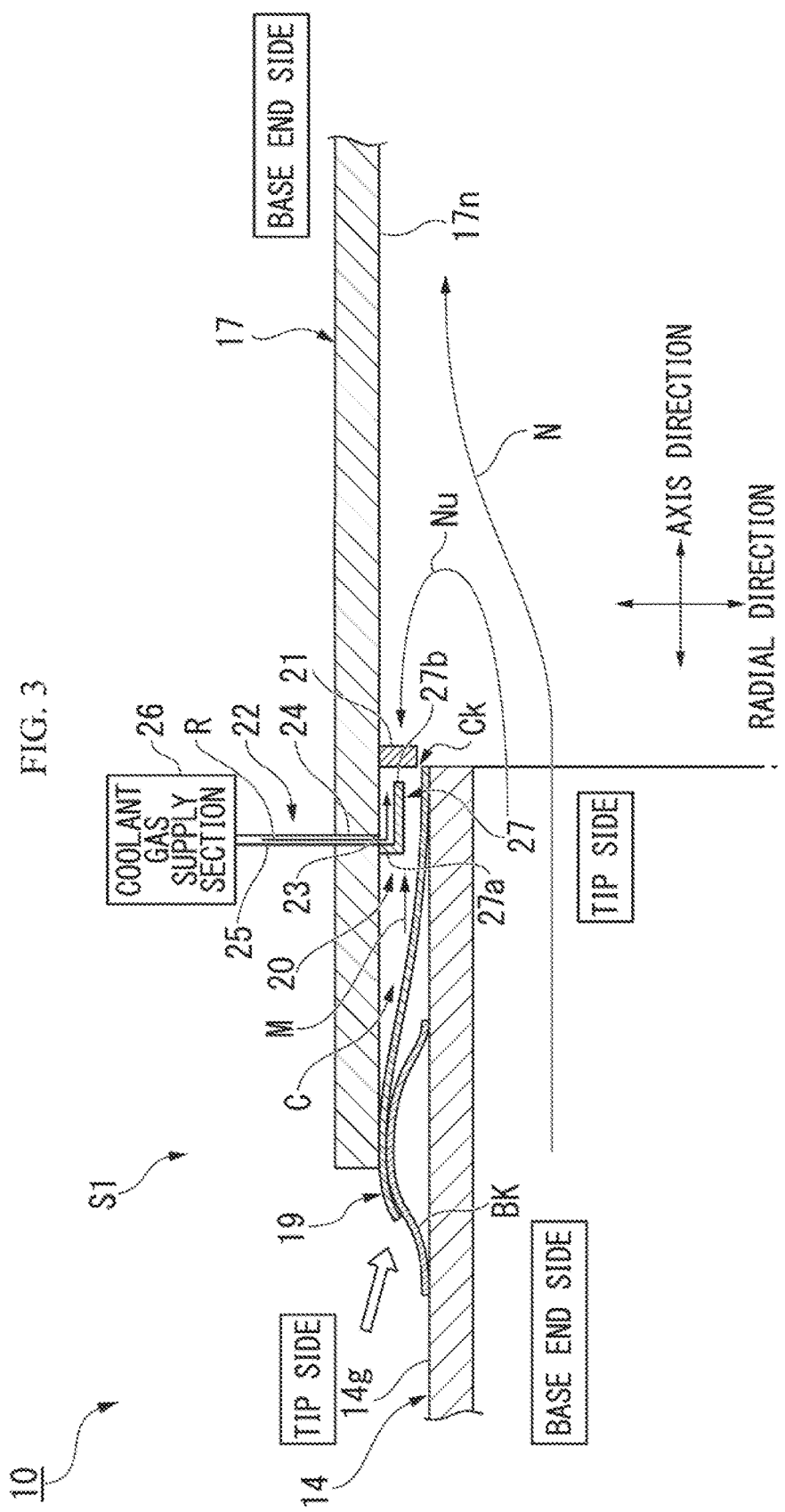
FIG. 3 is a schematic cross-sectional view showing a connection section between a combustor basket and a transition piece with respect to the combustor related to the first embodiment.

Here, FIG. 3 is a schematic cross-sectional view showing a connection section between the combustor basket 14 and the transition piece 17. A connection structure S1 between the combustor basket 14 and the transition piece 17 includes the transition piece 17, the combustor basket 14 inserted into the transition piece 17, a spring clip 19 provided at the combustor basket 14, and a backflow prevention unit 20 provided at the transition piece 17.

The transition piece 17 is a hollow tubular member, as shown in FIG. 3. On the other hand, the combustor basket 14 likewise is a hollow tubular member and the outer diameter thereof is formed slightly smaller than the inner diameter of the transition piece 17. An elastically deformable plate-shaped buggy clip BK is fixed to an outer peripheral surface 14g of the combustor basket 14 with the central portion thereof slightly separated from the outer peripheral surface 14g.

The spring clip 19 plays a role of connecting the combustor basket 14 to the transition piece 17 so as to be unable to fall off. The spring clip 19 is an elastically deformable leaf spring member, and one end portion thereof is fixed to the outer peripheral surface 14g of the combustor basket 14 and the other end portion thereof is in a state of being slightly separated from the outer peripheral surface 14g of the combustor basket 14 and being supported by the buggy clip BK from below, as shown in FIG. 3. The spring clip 19 which is configured in this manner is provided at the outer peripheral surface 14g of the combustor basket 14 over the entire circumference thereof. Then, in a state where the combustor basket 14 is inserted into the transition piece 17, the spring clip 19 is pressed against the inner peripheral surface of the transition piece 17 by the restoring force of the buggy clip BK crushed between the combustor basket 14 and the transition piece 17 and tries to restore itself to its original shape. In this way, the combustor basket 14 is prevented from falling off from the transition piece 17. Then, a gap C having a predetermined width is formed between the spring clip 19 and the transition piece 17 at a tip portion of the combustor basket 14.

The backflow prevention unit 20 prevents the combustion gas N which flows from the combustor basket 14 into the transition piece 17 from flowing backward through the gap C. The backflow prevention unit 20 has a throttle section 21 provided on an inner peripheral surface 17n of the transition piece 17, and cooling device 22 provided in proximity to the throttle section 21, as shown in FIG. 3.

The throttle section 21 plays a role of increasing the flow rate of leaked air M shown in FIG. 3, that is, air which flows from the turbine casing 11 into the gap C across the spring clip 19. The throttle section 21 is an annular member having a cross section of substantially rectangular shape, as shown in FIG. 3, and the outer diameter thereof is formed in substantially the same size as the inner diameter of the transition piece 17 and the inner diameter thereof is formed slightly larger than the outer diameter of the combustor basket 14. The throttle section 21 which is configured in this manner is fixed to the inner peripheral surface 17n of the transition piece 17 in the vicinity of the tip portion of the combustor basket 14 with its outer peripheral surface being in contact with the inner peripheral surface 17n, as shown in FIG. 3. Therefore, an opening area in an opening portion Ck of the gap C to the transition piece 17 is narrowed by an amount corresponding to the cross-sectional area of the throttle section 21, compared to the cross-sectional area of the gap C on the base end side of the combustor basket 14.

The cooling device 22 plays a role of cooling the throttle section 21. The cooling device 22 is formed to penetrate the transaction piece 17 in a radial direction at a tip side position closer than the throttle section 21, as shown in FIG. 3. The cooling device 22 has a coolant gas flow path 24 having an injection hole 23 (an injection section) provided to be opened on the inner peripheral surface 17n of the transition piece 17, a coolant gas supply section 26 connected to the coolant gas flow path 24 through piping 25, and a guide section 27 provided on the inner peripheral surface 17n of the transition piece 17 in proximity to the injection hole 23. In addition, although details are not shown in FIG. 3, coolant gas flow paths 24 are formed at predetermined intervals in the circumferential direction of the transition piece 17.

Here, the guide section 27 changes an injection direction of coolant gas injected from the injection hole 23 to the throttle section 21 side. The guide section 27 is provided with a mounting piece 27a which is mounted on the inner peripheral surface 17n of the transition piece 17, and a direction change piece 27b for changing the direction of the coolant gas injected from the injection hole 23, as shown in FIG. 3. In the guide section 27 which is configured in this manner, the mounting piece 27a thereof is fixed to the inner peripheral surface 17n of the transition piece 17 at a tip side position closer than the injection hole 23 with the direction change piece 27b thereof being substantially parallel to the inner peripheral surface 17n of the transition piece 17. Then, in this state, a tip portion of the direction change piece 27b extends to a base portion of the throttle section 21.

Next, the operation and effects of the combustor 10 related to the first embodiment will be described. According to the combustor 10 related to this embodiment, as shown in FIG. 3, when the combustion gas N flows from the combustor basket 14 having a small diameter to the transition piece 17 having a large diameter, a swirling current Nu is generated in the combustion gas N due to widening of a flow path. Then, the swirling current Nu tries to flow into the gap C formed between the transition piece 17 and the combustor basket 14. However, at the opening portion Ck of the gap C to the transition piece 17, the throttle section 21 is provided to protrude from the inner peripheral surface 17n of the transition piece 17, whereby the opening area of the gap C is narrowed. Therefore, the leaked air M which flows from the turbine casing 11 into the gap C and then flows toward the opening portion Ck increases in flow rate at a position where the opening area of the gap C is narrowed. As a result, the swirling current Nu of the combustion gas N generated in a connection section between the transition piece 17 and the combustor basket 14 is inhibited by the leaked air M which increased in flow rate, whereby the amount of the swirling current Nu flowing into the gap C is reduced. In addition, the opening area of the gap C is narrowed by the throttle section 21, whereby it becomes difficult for the swirling current Nu to flow into the gap C. Therefore, it is possible to suppress burnout of the spring clip 19 provided in the gap C due to exposure to the high-temperature combustion gas N.

Further, when an operation of the gas turbine 1 is started, supply of coolant gas R having low temperature and being in a compressed state from the coolant gas supply section 26 to the coolant gas flow path 24 is started accordingly. The coolant gas R is injected in the radial direction from the injection hole 23 through the coolant gas flow path 24. Then, the coolant gas R collides with the guide section 27 provided to face the injection hole 23 and the injection direction thereof is changed by about 90°, whereby the coolant gas R is injected toward the transition piece base end side from the transition piece tip side along the axial direction of the transition piece 17 and blown on the throttle section 21. Therefore, the throttle section 21 is subjected to so-called impingement cooling, whereby burnout of the throttle section itself is suppressed.

In addition, the cross-sectional shape of the throttle section 21 is not limited to that in this embodiment and a design change can be made appropriately. Further, in this embodiment, the throttle section 21 is formed into an annular shape and the throttle section 21 is provided over the entire circumference in the circumferential direction of the gap C between the combustor basket 14 and the transition piece 17. However, the throttle section 21 may be provided only at a portion along the circumferential direction of the gap C. For example, in a case where the axis of the transition piece 17 is inclined with respect to the axis of the combustor basket 14, since the gap C between the combustor basket 14 and the transition piece 17 is different in width depending on a position in the circumferential direction and pressure distribution in the gap C is also different depending on a position in the circumferential direction, the degree of burnout of the spring clip 19 also becomes different. Therefore, the throttle section 21 may be provided only at an area where it is easy for the spring clip 19 to be burned out especially, in consideration of the shape or the like of the combustor 10.

Further, in this embodiment, the throttle section 21 is provided on the inner peripheral surface 17n of the transition piece 17 so as to protrude toward the combustor basket 14. However, on the contrary, it is also possible to provide the throttle section 21 on the outer peripheral surface 14g of the combustor basket 14 so as to protrude toward the transition piece 17. In this case, an installation position of the cooling device 22 may be set on the combustor basket 14 in accordance with the throttle section 21, alternatively, the cooling device 22 may be provided at the transition piece 17 so as to inject the coolant gas R toward the throttle section 21 provided at the combustor basket 14 across the gap C.

Further, with respect to the shape, the size, or the installation position of the guide section 27 constituting the cooling device 22, a design change can be appropriately made depending on the size, the installation position, or the like of the throttle section 21. In addition, in this embodiment, the coolant gas supply section 26 constituting the cooling device 22 is separately provided outside the transition piece 17, as shown in FIG. 3. However, the coolant gas supply section 26 is not limited to that in this embodiment. For example, the turbine casing 11 shown in FIG. 2 may be used as the coolant gas supply section 26 and the coolant gas R taken in from the turbine casing 11 may be supplied to the coolant gas flow path 24. In this case, the piping 25 is unnecessary. Further, in a case where a transition piece cooling flow path (not shown) used to cool the transition piece itself is provided in the transition piece 17, the transition piece cooling flow path may be used as the coolant gas supply section 26 and the coolant gas R taken in from the transition piece cooling flow path may be supplied to the injection hole 23. Also in this case, the piping 25 is unnecessary. In addition, these modified examples can also be applied to each embodiment which will be described later.

Second Embodiment

Next, the configuration of a combustor 30 related to a second embodiment of the invention will be described. In the combustor 30 related to the second embodiment, in comparison with the combustor 10 related to the first embodiment, only a connection structure S2 between the combustor basket 14 and the transition piece 17 is different. Since other configurations are the same as those in the first embodiment, the same reference numerals as those in the first embodiment are used and a description thereof is omitted here.

Figure 4:
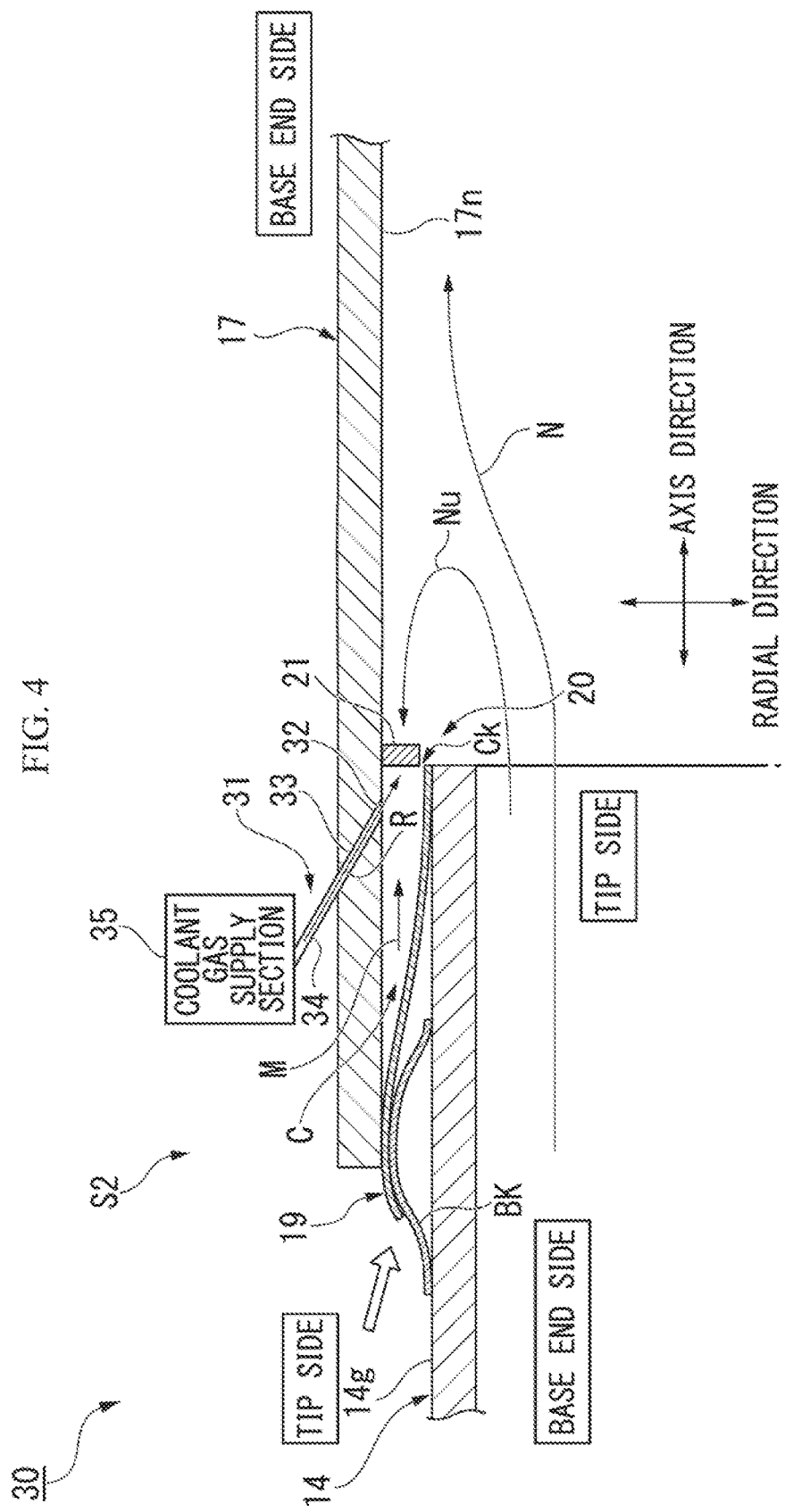
FIG. 4 is a schematic cross-sectional view showing a connection section between a combustor basket and a transition piece with respect to a combustor related to a second embodiment.

FIG. 4 is a schematic cross-sectional view showing the connection section between the combustor basket 14 and the transition piece 17 with respect to the combustor 30 related to the second embodiment. In the connection structure S2 between the combustor basket 14 and the transition piece 17 in this embodiment, in comparison with the connection structure S1 in the first embodiment shown in FIG. 3, only the configuration of cooling device 31 is different. Since other configurations and the operation and effects based thereon are the same as those in the first embodiment, in FIG. 4, the same reference numerals as those in FIG. 3 are applied and a description thereof is omitted here.

The cooling device 31 has a coolant gas flow path 33 which is formed to obliquely penetrate the transition piece 17 at a tip side position closer than the throttle section 21 and has an injection hole 32 (an injection section) provided to be opened on the inner peripheral surface 17n of the transition piece 17, and a coolant gas supply section 35 connected to the coolant gas flow path 33 through piping 34, as shown in FIG. 4. In addition, although details are not shown in FIG. 4, coolant gas flow paths 33 are formed at predetermined intervals in the circumferential direction of the transition piece 17.

Next, the operation and effects of the combustor 30 related to the second embodiment will be described. Also in the combustor 30 related to the second embodiment, similar to the combustor 10 related to the first embodiment, the leaked air M accelerated by the throttle section 21 inhibits inflow of the combustion gas N into the gap C, whereby burnout of the spring clip 19 is suppressed.

Further, when an operation of the gas turbine 1 is started, supply of the coolant gas R having low temperature and being in a compressed state from the coolant gas supply section 35 to the coolant gas flow path 33 is started accordingly. The coolant gas R is injected from the injection hole 32 through the coolant gas flow path 33. Here, since the coolant gas flow path 33 is formed to obliquely penetrate the transition piece 17, as described above, the coolant gas R is injected in a direction inclined by a predetermined angle with respect to the radial direction of the transition piece 17 and blown on the throttle section 21.

Therefore, the throttle section 21 is subjected to so-called impingement cooling, whereby burnout of the throttle section itself is suppressed. In this manner, according to this embodiment, since the injection direction of the coolant gas R is directed to the throttle section 21 by inclining the coolant gas flow path 33, it is not necessary to provide the guide section 27 to make the injection direction of the coolant gas R be directed to the throttle section 21, as in the first embodiment, and therefore, there is an advantage in that it is possible to attain simplification of a configuration.

Third Embodiment

Next, the configuration of a combustor 40 related to a third embodiment of the invention will be described. Also in the combustor 40 related to the third embodiment, in comparison with the combustor 10 related to the first embodiment, only a connection structure S3 between the combustor basket 14 and the transition piece 17 is different. Since other configurations are the same as those in the first embodiment, the same reference numerals as those in the first embodiment are used and a description thereof is omitted here.

Figure 5:
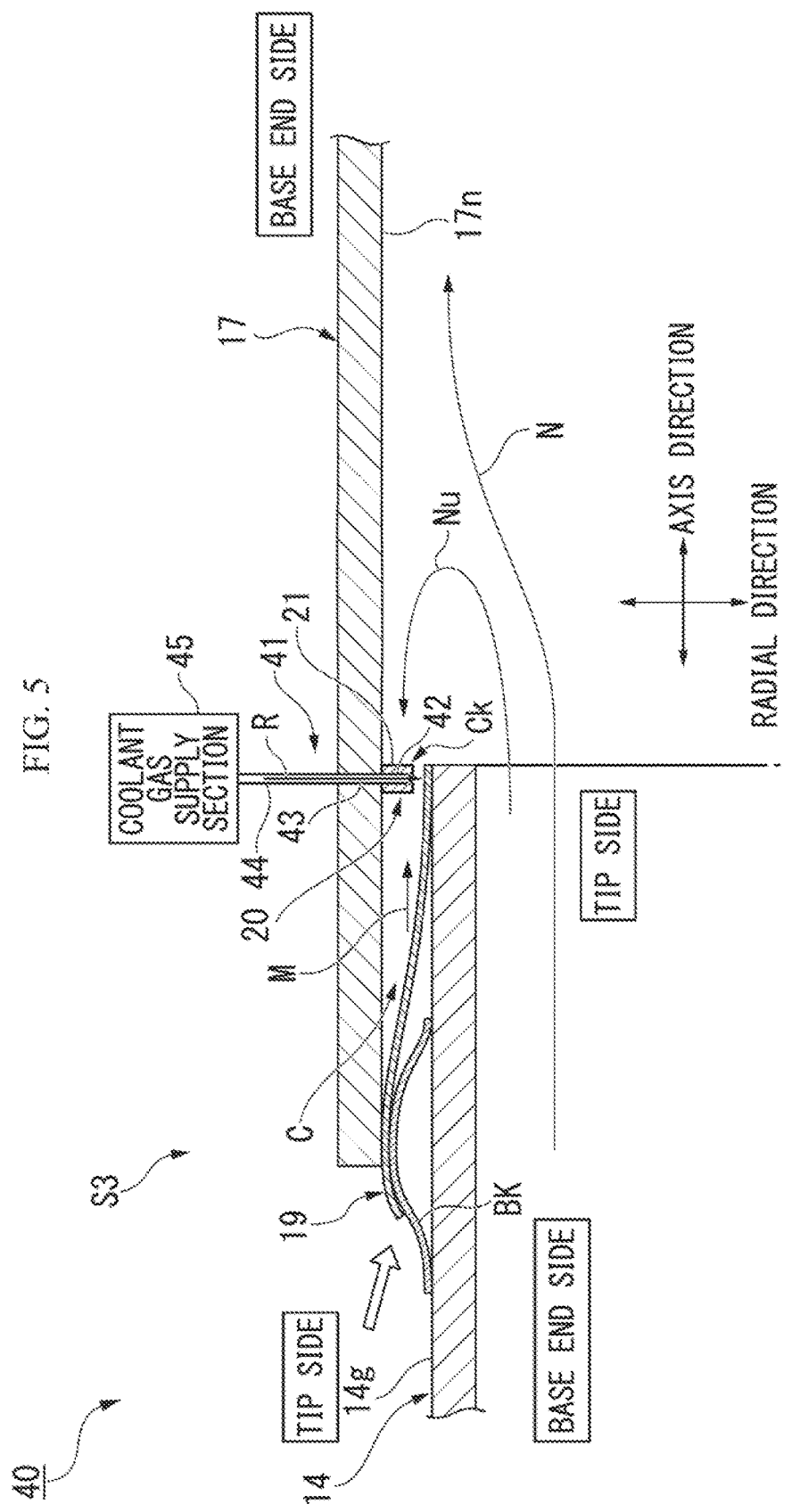
FIG. 5 is a schematic cross-sectional view showing a connection section between a combustor basket and a transition piece with respect to a combustor related to a third embodiment.

FIG. 5 is a schematic cross-sectional view showing the connection section between the combustor basket 14 and the transition piece 17 with respect to the combustor 40 related to the third embodiment. Also in the connection structure S3 between the combustor basket 14 and the transition piece 17 in this embodiment, in comparison with the connection structure S1 in the first embodiment shown in FIG. 3, only the configuration of a cooling device 41 is different. Since other configurations and the operation and effects based thereon are the same as those in the first embodiment, in FIG. 5, the same reference numerals as those in FIG. 3 are applied and a description thereof is omitted here.

The cooling device 41 has a first coolant gas flow path 42 formed to penetrate the throttle section 21 in the radial direction, a second coolant gas flow path 43 which is formed to penetrate the transition piece 17 in the radial direction and communicates with the first coolant gas flow path 42, and a coolant gas supply section 45 connected to the second coolant gas flow path 43 through piping 44, as shown in FIG. 5. In addition, although details are not shown in FIG. 5, second coolant gas flow paths 43 are formed at predetermined intervals in the circumferential direction of the transition piece 17 and first coolant gas flow paths 42 are also formed at predetermined intervals in the circumferential direction of the throttle section 21 correspondingly.

Next, the operation and effects of the combustor 40 related to the third embodiment will be described. Also in the combustor 40 related to the third embodiment, similar to the combustor 10 related to the first embodiment, the leaked air M accelerated by the throttle section 21 inhibits inflow of the combustion gas N into the gap C, whereby burnout of the spring clip 19 is suppressed.

Further, when an operation of the gas turbine 1 is started, supply of the coolant gas R from the coolant gas supply section 45 to the second coolant gas flow path 43 through the piping 44 is started. The coolant gas R flows from the second coolant gas flow path 43 into the first coolant gas flow path 42. Therefore, the throttle section 21 is subjected to so-called convection cooling by the flow of the coolant gas R in the inside thereof, whereby burnout of the throttle section itself is suppressed. Then, the coolant gas R is discharged from a tip of the throttle section 21 to the outside and flows downward, thereby forming a so-called air curtain between the throttle section 21 and the combustor basket 14. In this way, inflow of the combustion gas N into the gap C is further inhibited by the air curtain.

Figure 6:
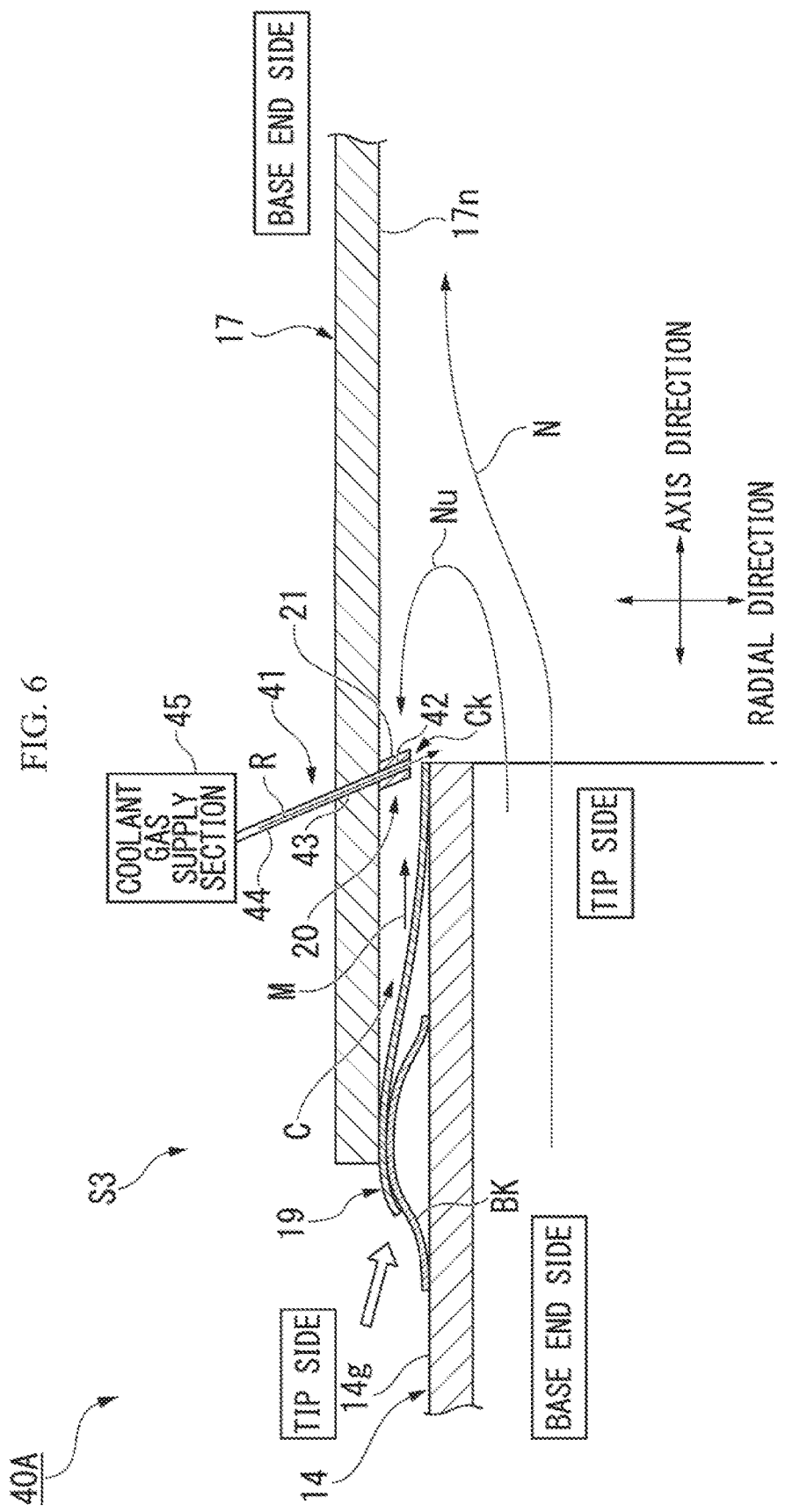
FIG. 6 is a schematic cross-sectional view showing a first modified example of the combustor related to the third embodiment.

Here, FIG. 6 is a schematic cross-sectional view showing a first modified example 40A of the combustor 40 related to the third embodiment. In the first modified example 40A, the throttle section 21 is provided so as to be inclined with respect to the radial direction of the transition piece 17 and a tip portion thereof is directed to the base end side of the transition piece 17. Then, the first coolant gas flow path 42 penetrating the throttle section 21 is also formed so as to be inclined with respect to the radial direction of the transition piece 17 depending on the protrusion direction of the throttle section 21 and the second coolant gas flow path 43 penetrating the transition piece 17 is also formed so as to be inclined with respect to the radial direction of the transition piece 17.

According to the configuration of the first modified example 40A, the coolant gas R which is discharged from the tip of the throttle section 21 to the outside through the first coolant gas flow path 42 has a discharge direction that is inclined with respect to the radial direction of the transition piece 17, and has a velocity component in the opposite direction to the flow direction of the combustion gas N that tries to flow into the gap C. Therefore, the coolant gas R forms an air curtain, thereby inhibiting inflow of the combustion gas N into the gap C, and in addition, offsets the flow of the combustion gas N, thereby further inhibiting inflow of the combustion gas N into the gap C.

In addition, in the first modified example 40A, the throttle section 21 is provided so as to be inclined with respect to the radial direction of the transition piece 17. However, there is no limitation thereto, and it is also possible to provide the throttle section 21 so as to extend parallel to the radial direction of the transition piece 17, and form only the first coolant gas flow path 42 and the second coolant gas flow path 43 so as to be inclined with respect to the radial direction of the transition piece 17.

Figure 7:
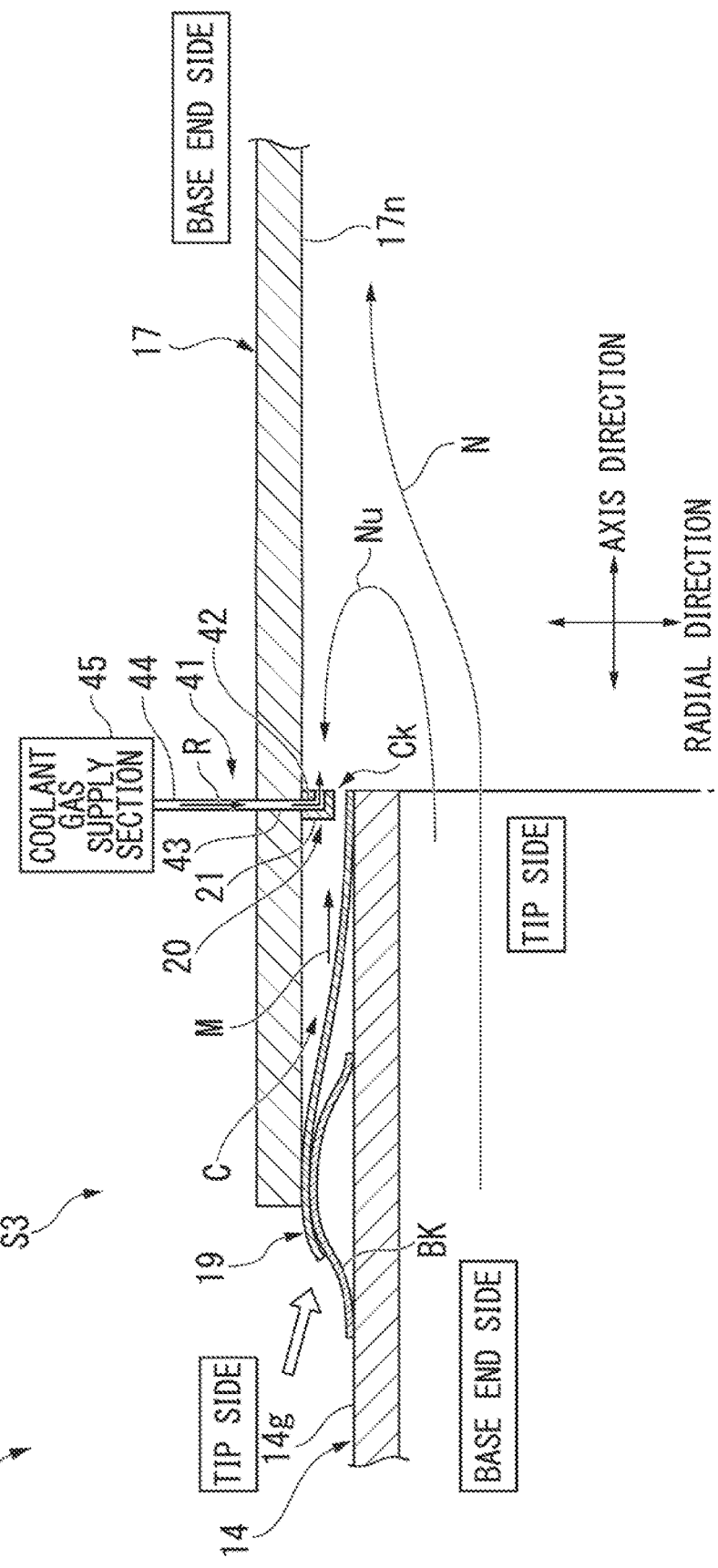
FIG. 7 is a schematic cross-sectional view showing a second modified example of the combustor related to the third embodiment.

Further, FIG. 7 is a schematic cross-sectional view showing a second modified example 40B of the combustor 40 related to the third embodiment. In the second modified example 40B, the throttle section 21 is provided so as to extend parallel to the radial direction of the transition piece 17 and the first coolant gas flow path 42 is formed to have an L-shaped cross section and be opened on an end face of the throttle section 21 on the base end side of the transition piece 17.

According to the configuration of the second modified example 40B, the coolant gas R which is discharged from the throttle section 21 to the outside through the first coolant gas flow path 42 is discharged in the direction opposite to the flow direction of the combustion gas N that tries to flow into the gap C. Therefore, inflow of the combustion gas N into the gap C is inhibited by the flow of the coolant gas R.

Fourth Embodiment

Next, the configuration of a combustor 50 related to a fourth embodiment of the invention will be described. Also in the combustor 50 related to the third embodiment, in comparison with the combustor 10 related to the first embodiment, only a connection structure S4 between the combustor basket 14 and the transition piece 17 is different. Since other configurations are the same as those in the first embodiment, the same reference numerals as those in the first embodiment are used and a description thereof is omitted here.

Figure 8:
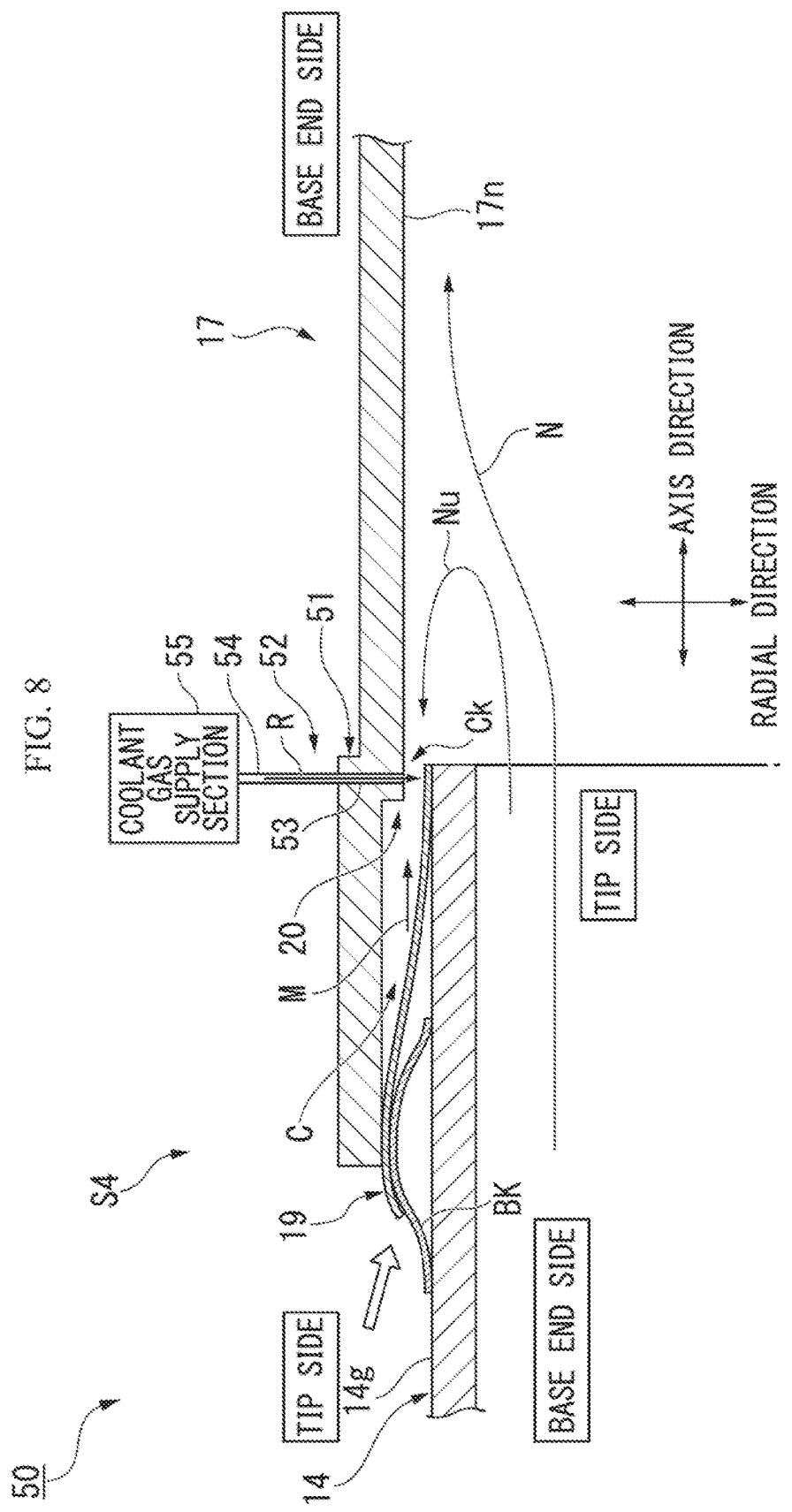
FIG. 8 is a schematic cross-sectional view showing a connection section between a combustor basket and a transition piece with respect to a combustor related to a fourth embodiment.

FIG. 8 is a schematic cross-sectional view showing the connection section between the combustor basket 14 and the transition piece 17 with respect to the combustor 50 related to the fourth embodiment. In the connection structure S4 between the combustor basket 14 and the transition piece 17 in this embodiment, in comparison with the connection structure S3 in the third embodiment shown in FIG. 5, the configurations of a throttle section 51 and cooling device 52 are different. Since other configurations are the same as those in the third embodiment, in FIG. 8, the same reference numerals as those in FIG. 5 are applied and a description thereof is omitted here.

The throttle section 51 is formed as a portion of the transition piece 17, as shown in FIG. 8. In more detail, a step-like throttle section 51 is provided in the transition piece 17 in the vicinity of the tip portion of the combustor basket 14 by setting the inner diameter of the transition piece 17 on the base end side thereof to be less than that on the tip side thereof. Then, the opening area at the opening portion Ck of the gap C is narrower than that of the gap C on the base end side of the combustor basket 14 by an amount corresponding to a reduction in the inner diameter of the transition piece 17 at the throttle section 51.

The cooling device 52 has a coolant gas flow path 53 formed to penetrate the throttle section 51 of the transition piece 17 in the radial direction, and a coolant gas supply section 55 connected to the coolant gas flow path 53 through piping 54, as shown in FIG. 8. In addition, although details are not shown in FIG. 8, coolant gas flow paths 53 are formed at predetermined intervals in the circumferential direction of the transition piece 17.

Next, the operation and effects of the combustor 50 related to the fourth embodiment will be described. Also in the combustor 50 related to the fourth embodiment, similar to the combustor 10 related to the first embodiment, the leaked air M accelerated by the throttle section 51 inhibits inflow of the combustion gas N into the gap C, whereby burnout of the spring clip 19 is suppressed.

According to the combustor 50 of the fourth embodiment configured in this manner, in addition to the operation and effects that the combustor 40 related to the third embodiment exhibits, by configuring the throttle section 51 as a portion of the transition piece 17, there is an advantage in that it is possible to attain cost reduction and the ease of management due to a reduction in the number of components, in comparison with the third embodiment in which the throttle section 21 is configured as a separate member from the transition piece 17.

Fifth Embodiment

Next, the configuration of a combustor 60 related to a fifth embodiment of the invention will be described. Also in the combustor 60 related to the fifth embodiment, in comparison with the combustor 10 related to the first embodiment, only a connection structure S5 between the combustor basket 14 and the transition piece 17 is different. Since other configurations are the same as those in the first embodiment, the same reference numerals as those in the first embodiment are used and a description thereof is omitted here.

Figure 9:
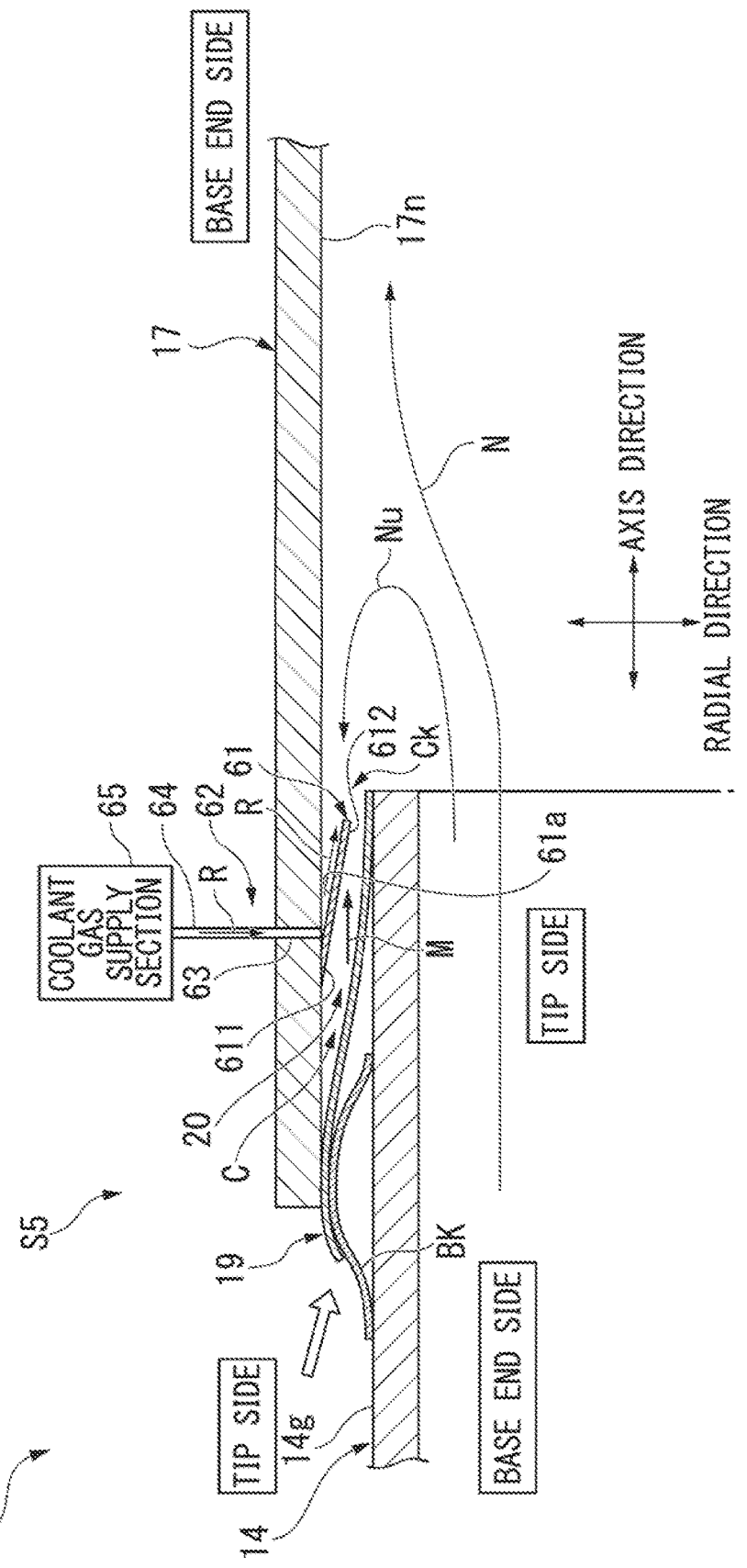
FIG. 9 is a schematic cross-sectional view showing a connection section between a combustor basket and a transition piece with respect to a combustor related to a fifth embodiment.

FIG. 9 is a schematic cross-sectional view showing the connection section between the combustor basket 14 and the transition piece 17 with respect to the combustor 60 related to the fifth embodiment. In the connection structure S5 between the combustor basket 14 and the transition piece 17 in this embodiment, in comparison with the connection structure S1 in the first embodiment shown in FIG. 3, the configurations of a throttle section 61 and cooling device 62 are different. Since other configurations are the same as those in the first embodiment, in FIG. 9, the same reference numerals as those in FIG. 3 are applied and a description thereof is omitted here.

The throttle section 61 is a tubular member formed into a tapered shape in which a diameter gradually changes from one end toward the other end along an axis direction, as shown in FIG. 9. In the throttle section 61, the outer diameter of a large diameter portion 611 that is one end in the axis direction is formed to be substantially equal to the inner diameter of the transition piece 17 and the outer diameter of a small diameter portion 612 that is the other end side in the axis direction is formed slightly larger than the outer diameter of the combustor basket 14. In the throttle section 61 which is configured in this manner, the large diameter portion 611 thereof is fixed to the inner peripheral surface 17*n* of the transition piece 17 in the vicinity of the tip of the combustor basket 14 and the small diameter portion 612 thereof is a free end, whereby the throttle section 61 becomes a cantilever. Then, in the gap C between the combustor basket 14 and the transition piece 17, due to the tapered shape of the throttle section 61, a gap width is made smaller at the position of the small diameter portion 612 than at the position of the large diameter portion 611. Therefore, the opening area in the opening portion Ck of the gap C to the transition piece 17 is narrow, compared to the cross-sectional area of the gap C on the base end side of the combustor basket 14.

The cooling device 62 has a coolant gas flow path 63 formed to penetrate the transition piece 17 at a base end side position closer than the fixed position of the throttle section 61, in other words, a tip side position of the combustor basket 14, and a coolant gas supply section 65 connected to the coolant gas flow path 63 through piping 64, as shown in FIG. 9. In addition, although details are not shown in FIG. 9, coolant gas flow paths 63 are formed at predetermined intervals in the circumferential direction of the transition piece 17.

Next, the operation and effects of the combustor 60 related to the fifth embodiment will be described. Also in the combustor 60 related to this embodiment, similar to the combustor 10 related to the first embodiment, the opening area in the opening portion Ck of the gap C is narrow, compared to the cross-sectional area on the combustor basket base end side of the gap C. Therefore, the leaked air M which flows from the outside into the gap C across the spring clip 19 increases in flow rate at a position where the opening area of the gap C is narrowed. As a result, the swirling current Nu of the combustion gas N which tries to flow into the gap C is inhibited by the flow of the leaked air M which increases in flow rate in the opposite direction, whereby the amount of the swirling current Nu flowing into the gap C is reduced. Therefore, it is possible to suppress burnout of the spring clip 19 provided in the gap C due to exposure to the combustion gas N.

Further, when an operation of the gas turbine 1 is started, supply of the coolant gas R from the coolant gas supply section 65 to the coolant gas flow path 63 through the piping 64 is started. The coolant gas R is discharged from one end opening of the coolant gas flow path 63 through the coolant gas flow path 63 and then flows along a surface 61*a* of the throttle section 61. Therefore, the throttle section 61 is subjected to so-called film cooling by a thin film of the coolant gas R which is formed on the surface 61a, whereby burnout of the throttle section itself is suppressed.

Sixth Embodiment

Next, the configuration of a combustor 70 related to a sixth embodiment of the invention will be described. In the combustor 70 related to the sixth embodiment, in comparison with the combustor 10 related to the first embodiment, only a connection structure S6 between the combustor basket 14 and the transition piece 17 is different. Since other configurations are the same as those in the first embodiment, the same reference numerals as those in the first embodiment are used and a description thereof is omitted here.

Figure 10:
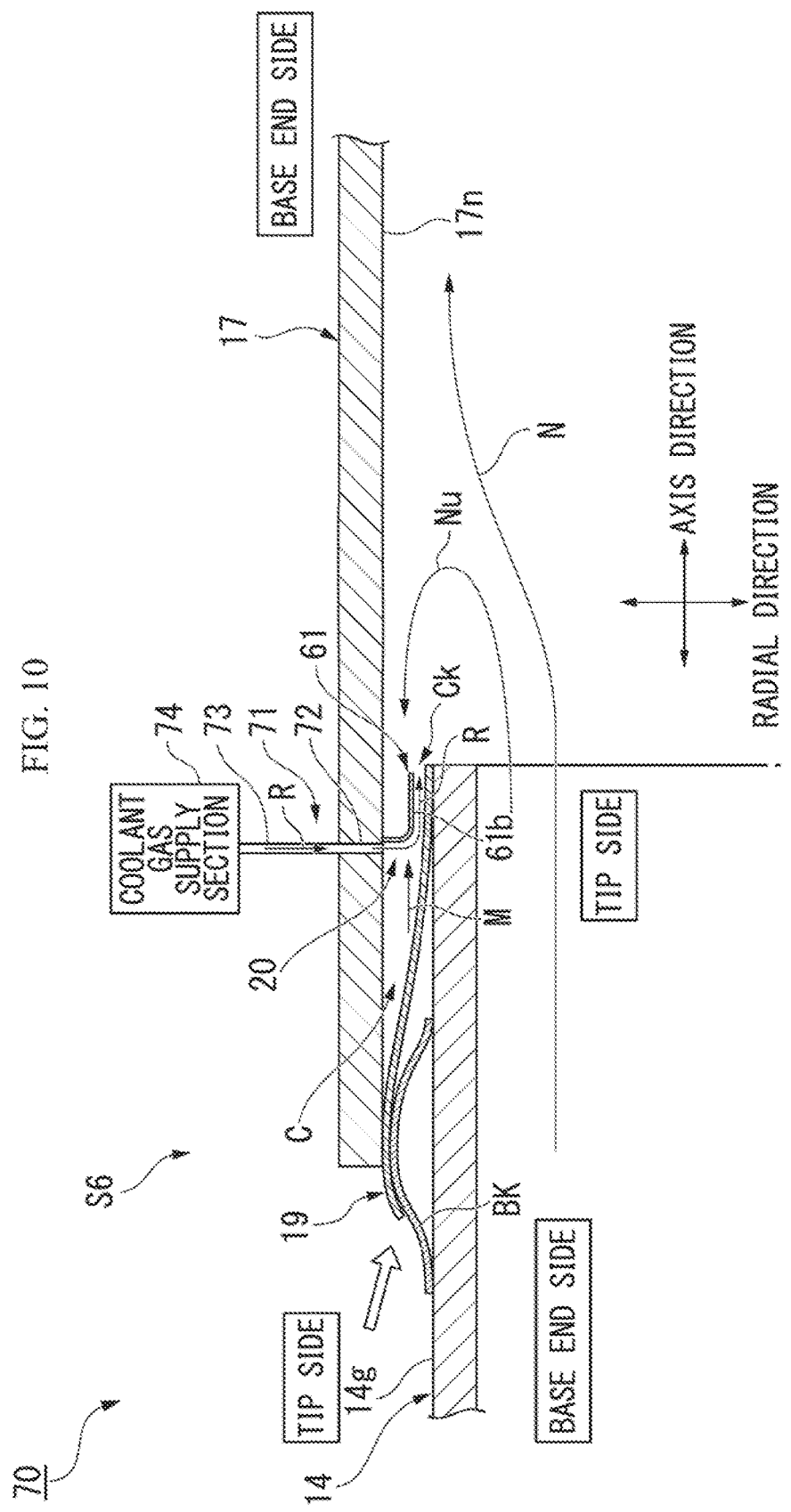
FIG. 10 is a schematic cross-sectional view showing a connection section between a combustor basket and a transition piece with respect to a combustor related to a sixth embodiment.

FIG. 10 is a schematic cross-sectional view showing the connection section between the combustor basket 14 and the transition piece 17 with respect to the combustor 70 related to the sixth embodiment. In the connection structure S6 between the combustor basket 14 and the transition piece 17 in this embodiment, in comparison with the connection structure S5 in the fifth embodiment shown in FIG. 9, only the configuration of cooling device 71 is different. Since other configurations and the operation and effects based thereon are the same as those in the fifth embodiment, in FIG. 10, the same reference numerals as those in FIG. 9 are applied and a description thereof is omitted here.

The cooling device 71 has a coolant gas flow path 72 formed to penetrate the transition piece 17 at a tip side position closer than the fixed position of the throttle section 61, in other words, a base end side position of the combustor basket 14, and a coolant gas supply section 74 connected to the coolant gas flow path 72 through piping 73, as shown in FIG. 10. In addition, although details are not shown in FIG. 10, coolant gas flow paths 72 are formed at predetermined intervals in the circumferential direction of the transition piece 17.

Next, the operation and effects of the combustor 70 related to the sixth embodiment will be described. Also in the combustor 70 related to the sixth embodiment, similar to the combustor 60 related to the fifth embodiment, the leaked air M accelerated by the throttle section 61 inhibits inflow of the combustion gas N into the gap C, whereby burnout of the spring clip 19 is suppressed.

Further, if an operation of the gas turbine 1 is started, supply of the coolant gas R from the coolant gas supply section 74 to the coolant gas flow path 72 through the piping 73 is started. The coolant gas R is discharged from one end opening of the coolant gas flow path 72 through the coolant gas flow path 72 and then flows along a surface 61b of the throttle section 61. In this way, the throttle section 61 is subjected to so-called film cooling by a thin film of the coolant gas R which is formed on the surface 61b, whereby burnout of the throttle section itself is suppressed. In addition, since after the coolant gas R is separated from the surface 61b of the throttle section 61, the coolant gas R joins the leaked air M and then flows from the opening portion Ck of the gap C into the transition piece 17, it is possible to more reliably suppress inflow of the combustion gas N into the gap C.

Seventh Embodiment

Next, the configuration of a combustor 80 related to a seventh embodiment of the invention will be described. In the combustor 80 related to the seventh embodiment, in comparison with the combustor 10 related to the first embodiment, only a connection structure S7 between the combustor basket 14 and the transition piece 17 is different. Since other configurations are the same as those in the first embodiment, the same reference numerals as those in the first embodiment are used and a description thereof is omitted here.

Figure 11:
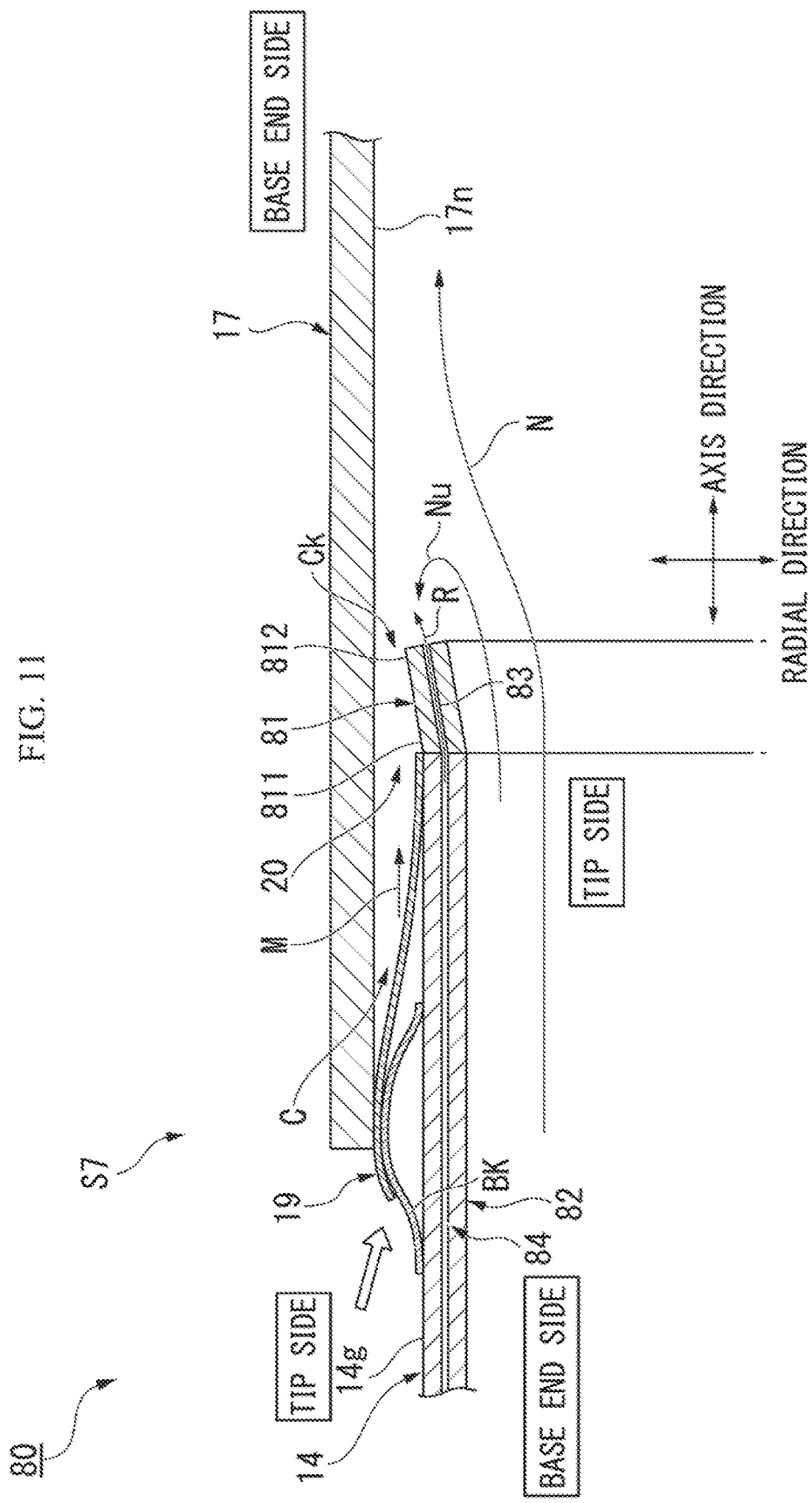
FIG. 11 is a schematic cross-sectional view showing a connection section between a combustor basket and a transition piece with respect to a combustor related to a seventh embodiment.

FIG. 11 is a schematic cross-sectional view showing the connection section between the combustor basket 14 and the transition piece 17 with respect to the combustor 80 related to the seventh embodiment. In the connection structure S7 between the combustor basket 14 and the transition piece 17 in this embodiment, in comparison with the connection structure S1 in the first embodiment shown in FIG. 3, the configurations of a throttle section 81 and cooling device 82 are different. Since other configurations are the same as those in the first embodiment, in FIG. 11, the same reference numerals as those in FIG. 3 are applied and a description thereof is omitted here.

The throttle section 81 is a tubular member formed into a tapered shape in which a diameter gradually changes from one end toward the other end along the axis direction, as shown in FIG. 11. In the throttle section 81, the outer diameter of a small diameter portion 811 that is one end side in the axis direction is formed to be substantially equal to the outer diameter of the combustor basket 14 and the outer diameter of a large diameter portion 812 that is the other end side in the axis direction is formed slightly smaller than the inner diameter of transition piece 17. In the throttle section 81 which is configured in this manner, the small diameter portion 811 thereof is fixed to the tip of the combustor basket 14 and also the large diameter portion 812 thereof is a free end, whereby the throttle section 81 becomes a cantilever. Then, in the gap C between the combustor basket 14 and the transition piece 17, due to the tapered shape of the throttle section 81, a gap width is made smaller at the position of the large diameter portion 812 than at the position of the small diameter portion 811. Therefore, the opening area in the opening portion Ck of the gap C to the transition piece 17 is narrow, compared to the cross-sectional area of the gap C on the base end of the combustor basket 14.

The cooling device 82 has a coolant gas flow path 83 formed to penetrate the throttle section 81 in a generatrix direction, and a coolant gas supply section 84 which is formed to penetrate the combustor basket 14 in the axis direction and communicates with the coolant gas flow path 83. In addition, although details are not shown in FIG. 11, cooling flow paths of the combustor basket 14 and coolant gas flow paths 83 are formed at predetermined intervals in the circumferential direction of the combustor basket 14.

Next, the operation and effects of the combustor 80 related to the seventh embodiment will be described. Also in the combustor 80 related to the seventh embodiment, similar to the combustor 10 related to the first embodiment, the leaked air M accelerated by the throttle section 81 inhibits inflow of the combustion gas N into the gap C, whereby burnout of the spring clip 19 is suppressed.

Further, when an operation of the gas turbine 1 is started, supply of the coolant gas R from the coolant gas supply section 84 to the coolant gas flow path 83 is started. Therefore, the throttle section 81 is subjected to convection cooling by the flow of the coolant gas R in the inside thereof, whereby burnout of the throttle section itself is suppressed. Thereafter, the coolant gas R is discharged from the tip of the throttle section 81 to the outside, whereby an air curtain is formed between the throttle section 81 and the transition piece 17. Therefore, inflow of the combustion gas N into the gap C is further inhibited by the air curtain.

Eighth Embodiment

Next, the configuration of a combustor 90 related to an eighth embodiment of the invention will be described. In the combustor 90 related to the eighth embodiment, in comparison with the combustor 10 related to the first embodiment, only a connection structure S8 between the combustor basket 14 and the transition piece 17 is different. Since other configurations are the same as those in the first embodiment, the same reference numerals as those in the first embodiment are used and a description thereof is omitted here.

Figure 12:
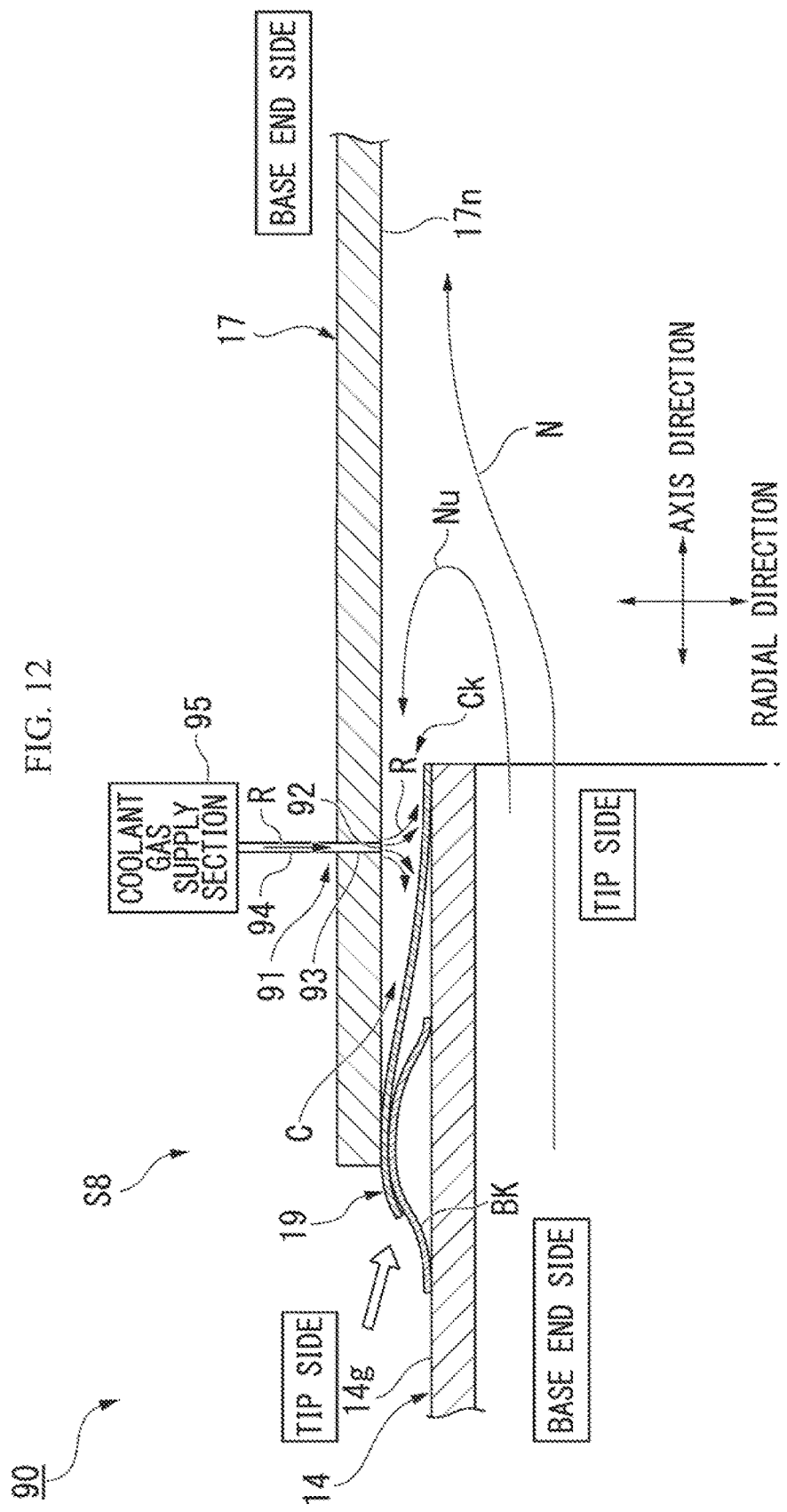
FIG. 12 is a schematic cross-sectional view showing a connection section between a combustor basket and a transition piece with respect to a combustor related to an eighth embodiment.

FIG. 12 is a schematic cross-sectional view showing the connection section between the combustor basket 14 and the transition piece 17 with respect to the combustor 90 related to the eighth embodiment. In the connection structure S8 between the combustor basket 14 and the transition piece 17 in this embodiment, in comparison with the connection structure S1 in the first embodiment shown in FIG. 3, the configuration of a backflow prevention unit 91 to prevent backflow of the combustion gas N is different. Since other configurations and the operation and effects based thereon are the same as those in the first embodiment, the same reference numerals as those in the first embodiment are used and a description thereof is omitted here.

The backflow prevention unit 91 has a coolant gas flow path 93 which is formed to penetrate the transition piece 17 in the radial direction and has an injection hole 92 provided to be opened on the inner peripheral surface 17n of the transition piece 17, and a coolant gas supply section 95 connected to the coolant gas flow path 93 through piping 94, as shown in FIG. 12. In addition, although details are not shown in FIG. 12, coolant gas flow paths 93 are formed at predetermined intervals in the circumferential direction of the transition piece 17.

Next, the operation and effects of the combustor 90 related to the eighth embodiment will be described. In the combustor 90 related to this embodiment, when an operation of the gas turbine 1 is started, supply of the coolant gas R having low temperature and being in a compressed state from the coolant gas supply section 95 to the coolant gas flow path 93 is started accordingly. The coolant gas R is injected in the radial direction from the injection hole 92 through the coolant gas flow path 93, thereby forming an air curtain between the transition piece 17 and the combustor basket 14. Therefore, inflow of the combustion gas N into the gap C is inhibited by the air curtain.

Ninth Embodiment

Next, the configuration of a combustor 100 related to a ninth embodiment of the invention will be described. In the combustor 100 related to the ninth embodiment, in comparison with the combustor 10 related to the first embodiment, only a connection structure S9 between the combustor basket 14 and the transition piece 17 is different. Since other configurations are the same as those in the first embodiment, the same reference numerals as those in the first embodiment are used and a description thereof is omitted here.

Figure 13:
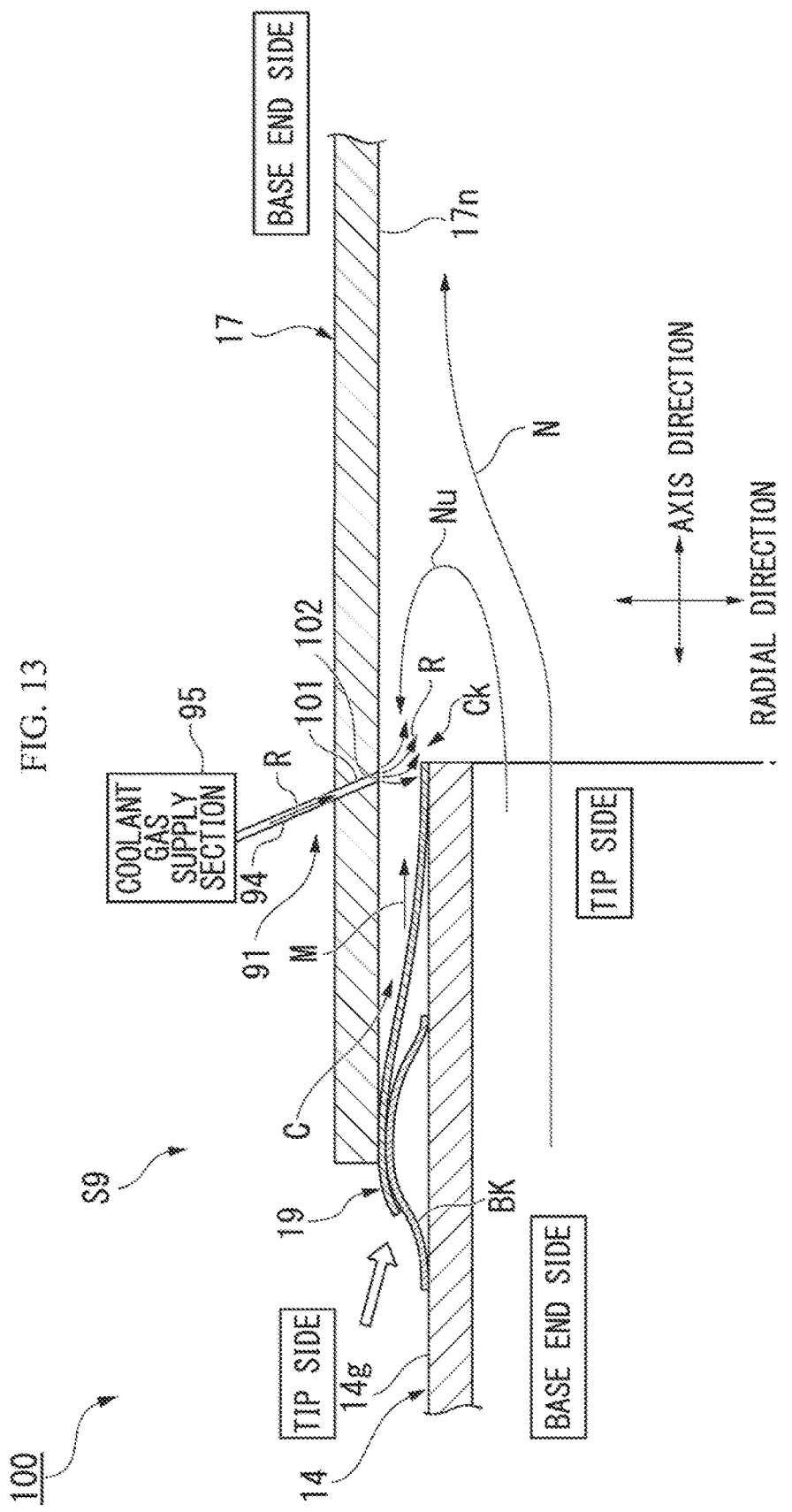
FIG. 13 is a schematic cross-sectional view showing a connection section between a combustor basket and a transition piece with respect to a combustor related to a ninth embodiment.

FIG. 13 is a schematic cross-sectional view showing the connection section between the combustor basket 14 and the transition piece 17 with respect to the combustor 100 related to the ninth embodiment. In the connection structure S9 between the combustor basket 14 and the transition piece 17 in this embodiment, in comparison with the connection structure S8 in the eighth embodiment shown in FIG. 12, only the configuration of a coolant gas flow path 101 is different. Since other configurations and the operation and effects based thereon are the same as those in the eighth embodiment, in FIG. 13, the same reference numerals as those in FIG. 12 are applied and a description thereof is omitted here.

The coolant gas flow path 101 is the same as the coolant gas flow path 93 of the eighth embodiment in that the coolant gas flow path 101 is formed to penetrate the transition piece 17 and has an injection hole 102 provided to be opened on the inner peripheral surface 17n of the transition piece 17, as shown in FIG. 13. However, a direction penetrating the transition piece 17 is different from that in the eighth embodiment. That is, the coolant gas flow path 101 in this embodiment penetrates the transition piece 17 so as to extend in a direction inclined by a predetermined angle with respect to the radial direction.

Next, the operation and effects of the combustor 100 related to the ninth embodiment will be described. In the combustor 100 related to this embodiment, the injection direction of the coolant gas R which is injected from the injection hole 102 is a direction inclined with respect to the radial direction of the transition piece 17, and the coolant gas R has a velocity component in the opposite direction to the flow direction of the combustion gas N that tries to flow into the gap C. Therefore, the coolant gas R forms an air curtain between the transition piece 17 and the combustor basket 14, similar to the eighth embodiment, thereby inhibiting inflow of the combustion gas N into the gap C, and in addition, offsets the flow of the combustion gas N, thereby further inhibiting inflow of the combustion gas N into the gap C.

In addition, various shapes, the combination, operation procedure, or the like of each constituent member shown in the embodiments described above is one example and various changes can be made based on design requirements or the like within a scope which does not depart from the gist of the invention.

INDUSTRIAL APPLICABILITY

According to the combustor related to the invention, it is possible to reliably prevent the spring clip provided in the gap between the combustor basket and the transition piece from burning out by being exposed to the high-temperature combustion gas which has flowed into the gap.

REFERENCE SIGNS LIST

1: gas turbine
2: compressor
3: turbine rotor
4: turbine
5: air intake port
10: combustor
11: turbine casing
12: casing
13: support member
14: combustor basket
15: fuel nozzle
16: turbine-side gas flow path
17: transition piece
18: bypass pipe
19: spring clip
20: backflow prevention unit
21: throttle section
22: cooling device 23: injection hole
24: coolant gas flow path
25: piping
26: coolant gas supply section
27: guide section
30: combustor
31: cooling device
32: injection hole
33: coolant gas flow path
34: piping
35: coolant gas supply section
40: combustor
41: cooling device
42: first coolant gas flow path
43: second coolant gas flow path
44: piping
45: coolant gas supply section
50: combustor
51: throttle section
52: cooling device
53: coolant gas flow path
54: piping
55: coolant gas supply section
60: combustor
61: throttle section
62: cooling device
63: coolant gas flow path
64: piping
65: coolant gas supply section
70: combustor
71: cooling device
72: coolant gas flow path
73: piping
74: coolant gas supply section
80: combustor
81: throttle section
82: cooling device
83: coolant gas flow path
84: coolant gas supply section
90: combustor
91: backflow prevention unit
92: injection hole
93: coolant gas flow path
94: piping
95: coolant gas supply section
100: combustor
101: coolant gas flow path
102: injection hole
14g: outer peripheral surface (combustor basket)
17n: inner peripheral surface (transition piece)
27a: mounting piece (guide section)
27b: direction change piece (guide section)
40A: first modified example
40B second modified example
611: large diameter portion
612: small diameter portion
61a: surface (throttle section)
61b: surface (throttle section)
811: small diameter portion
812: large diameter portion
A: compressed air
BK: buggy clip
C: gap
Ck: opening portion
F: flow direction
M: leaked air
N: combustion gas
Nu: swirling current (combustion gas)
R: coolant gas
S1: connection structure
S2: connection structure
S2: connection structure
S3: connection structure
S4: connection structure
S5: connection structure
S6: connection structure
S7: connection structure
S8: connection structure
S9: connection structure

The invention claimed is:

1. A combustor comprising:
a combustor basket in which compressed air and fuel are mixed to form a mixture with each other and the mixture is combusted;
a transition piece in which a tip portion of the combustor basket is inserted with a gap therebetween;
a spring clip that seals the gap between the combustor basket and the transition piece;
a throttle section that is provided in an opening portion of the gap, the opening portion opening on a tip side of the combustor basket to the transition piece, and narrows an opening area of the opening portion, compared to a base end side of the combustor basket; and
a cooling device that has a cooling fluid flow path upstream of a fixed position of the throttle section of the transition piece for cooling the throttle section,
the cooling device comprising:
an injection section that injects a cooling fluid toward the opening portion; and
a guide section that is provided with a direction change piece and that is configured to change an injection direction of the cooling fluid toward the throttle section, the direction change piece being spaced apart from the spring clip and being spaced apart from the throttle section,
wherein the throttle section is provided by projecting an inner surface of the transition piece toward the combustor basket.

2. The combustor according to claim 1, wherein the cooling device cools the throttle section by injecting the cooling fluid to the throttle section.

3. The combustor according to claim 1, wherein the cooling device cools the throttle section by making a cooling fluid flow along the surface of the throttle section.

4. The combustor according to claim 3, wherein the cooling device makes the cooling fluid flow along the surface of the throttle section, wherein the surface of the throttle section is a surface of the throttle section facing the tip side of the combustor basket.

5. The combustor according to claim 3, wherein the cooling device makes the cooling fluid flow along the surface of the throttle section, wherein the surface of the throttle section is a surface of the throttle section facing the base end side of the combustor basket.

6. A gas turbine comprising: the combustor according to claim 1.

7. A combustor comprising:
a combustor basket in which compressed air and fuel are mixed to form a mixture with each other and the mixture is combusted;
a transition piece in which a tip portion of the combustor basket is inserted with a gap therebetween;
a spring clip that seals the gap between the combustor basket and the transition piece;

a throttle section that is provided in an opening portion of the gap, the opening portion opening on a tip side of the combustor basket to the transition piece, and narrows an opening area of the opening portion, compared to a base end side of the combustor basket; and a cooling device for cooling the throttle section, wherein the throttle section is tubular and has an L-shape as seen from a cross section parallel to an axis direction of the transition piece, one end portion of the throttle section is fixed to an inner peripheral surface of the transition piece and the other end portion of the throttle section is disposed in the opening portion, and the cooling device injects a cooling fluid from a tip side position of the transition piece closer than a fixed position of the throttle section of the transition piece and is configured to make a cooling fluid flow along a surface of the throttle section to cool the throttle section.

8. The combustor according to claim 7, wherein the throttle section is provided by projecting an inner surface of the transition piece toward the combustor basket.

9. The combustor according to claim 7, wherein the cooling device has an injection section that injects the cooling fluid toward the opening portion, and a guide section that guides the injected cooling fluid toward the throttle section.

10. The combustor according to claim 7, wherein the cooling device makes the cooling fluid flow along a surface of the throttle section facing the tip side of the combustor basket.

11. The combustor according to claim 7, wherein the cooling device makes the cooling fluid flow along a surface of the throttle section facing the base end side of the combustor basket.

12. A gas turbine comprising: the combustor according to claim 7.

* * * * *